United States Patent
Lin et al.

(10) Patent No.: US 9,444,910 B2
(45) Date of Patent: Sep. 13, 2016

(54) VALIDATION ASSOCIATED WITH A FORM

(71) Applicant: Alibaba Group Holding Limited, George Town, KY (US)

(72) Inventors: Jincheng Lin, Hangzhou (CN); Hexiang Yang, Hangzhou (CN)

(73) Assignee: Alibaba Group Holding Limited (KY)

( * ) Notice: Subject to any disclaimer, the term of this patent is extended or adjusted under 35 U.S.C. 154(b) by 328 days.

(21) Appl. No.: 13/787,259

(22) Filed: Mar. 6, 2013

(65) Prior Publication Data
US 2013/0238691 A1    Sep. 12, 2013

(30) Foreign Application Priority Data
Mar. 8, 2012    (CN) .......................... 2012 1 0059741

(51) Int. Cl.
*H04L 29/06* (2006.01)
*G06F 21/55* (2013.01)

(52) U.S. Cl.
CPC .............. *H04L 67/42* (2013.01); *G06F 21/55* (2013.01); *H04L 63/1416* (2013.01)

(58) Field of Classification Search
CPC ................... G06F 17/30889; G06F 17/2089; G06F 21/34; G06F 17/241–17/243; G06F 17/30873–17/3089; H04L 67/42; H04L 63/123; H04L 63/12
USPC ......... 709/203, 246, 248; 715/212, 221, 234
See application file for complete search history.

(56) References Cited

U.S. PATENT DOCUMENTS

| | | | |
|---|---|---|---|
| 6,874,120 B2 | 3/2005 | Le et al. | |
| 7,284,193 B1 * | 10/2007 | Lindhorst et al. | 715/234 |
| 7,934,149 B1 * | 4/2011 | Raje | 715/221 |
| 8,219,687 B2 | 7/2012 | Huang et al. | |
| 2002/0178187 A1 * | 11/2002 | Rasmussen | H04L 63/12 715/234 |
| 2008/0263358 A1 * | 10/2008 | Alme | H04L 63/14 713/176 |
| 2010/0287132 A1 * | 11/2010 | Hauser | G06F 17/241 706/52 |
| 2010/0318563 A1 * | 12/2010 | Deprun | 707/769 |
| 2010/0318889 A1 * | 12/2010 | Billharz et al. | 715/212 |
| 2010/0328074 A1 | 12/2010 | Johnson et al. | |
| 2010/0332487 A1 | 12/2010 | Monden | |
| 2011/0107077 A1 * | 5/2011 | Henderson | G06F 21/14 713/150 |
| 2011/0119155 A1 * | 5/2011 | Hammad et al. | 705/26.41 |
| 2012/0023377 A1 * | 1/2012 | Garskof | 714/48 |

(Continued)

FOREIGN PATENT DOCUMENTS

| | | |
|---|---|---|
| CN | 101431410 | 5/2009 |
| CN | 101431413 | 5/2009 |

(Continued)

*Primary Examiner* — Wing F Chan
*Assistant Examiner* — Raji Krishnan
(74) *Attorney, Agent, or Firm* — Van Pelt, Yi & James LLP

(57) ABSTRACT

Form validation is disclosed, including: generating a first parameter and a second parameter in response to a request for a form from a client device; sending a first triggering message including the first parameter and the second parameter to the client device; receiving data associated with submission of the form; and determining whether the data associated with the submission of the form includes the hidden form field that matches the first parameter and a submitted value corresponding to the hidden form field that corresponds to the second parameter, in the event that the hidden form field matches the first parameter and the submitted value corresponding to the hidden form field corresponds to the second parameter, determine that the data associated with the submission of the form is successfully validated.

13 Claims, 7 Drawing Sheets

(56) References Cited

U.S. PATENT DOCUMENTS

2012/0116976 A1  5/2012  Hammad
2012/0201375 A1* 8/2012  Kisielewicz .......... H04L 9/0891
                                              380/30

FOREIGN PATENT DOCUMENTS

| | | |
|---|---|---|
| JP | 2002073551 | 3/2002 |
| JP | 2004334859 | 11/2004 |
| JP | 2007272574 | 10/2007 |

* cited by examiner

VALIDATION ASSOCIATED WITH A FORM

CROSS REFERENCE TO OTHER APPLICATIONS

This application claims priority to People's Republic of China Patent Application No. 201210059741.8 entitled A FORM VALIDATION METHOD, DEVICE, AND SYSTEM, filed Mar. 8, 2012 which is incorporated herein by reference for all purposes.

FIELD OF THE INVENTION

The present application involves the field of internet technology. In particular, the present application relates to techniques for form validation.

BACKGROUND OF THE INVENTION

Forms are an important means of exchanging data between client devices and servers, for example. Sometimes forms are also used by client devices for the purpose of local and/or remote data collection.

Forms typically comprise form fields and form buttons and other components. For example, other components that may be included in forms include input fields, such as text fields and password fields. To increase transmission security, during the generation of forms, hidden form fields with preset names are also generated and included in certain forms. A hidden form field is an invisible element of the form that is not seen by a user that visits the webpage at which the form is presented. Therefore, the user cannot input any content into a hidden field, which is why sometimes the hidden field is used to submit information that is not input by the user.

Conventionally, a client device retrieves a user requested form (e.g., associated with a webpage that is visited by the user), the form is presented by the web browser installed at the client device, and the user can input data into the form's input fields. After the user completes filling out the form, the user selects a form submission button and the client device submits the data that was input into the form to an associated web server where the web server may further process the submitted form data. However, conventional techniques typically cannot determine whether the form data was completed by a real person user (a human). One reason it would be desirable to ensure that form data is completed and submitted by human users is that when forms are automatically completed and/or submitted by robots or specialized computer programs, negative consequences such as spamming or malicious forum flooding may occur.

One conventional technique of validating that a submitted form was completed by a human user is realized by validating one or more hidden fields included in the form. For example, a hidden form field includes a name and a value. Each time the form is requested by the client device (as a result of a user request), the server generates a random character and transmits it to the client device, which causes the client device to use the random character as the numerical value of the hidden form field. As such, when the server receives the user-completed form submitted by the client device, form validation is realized by verifying whether or not the value of the hidden form field matches the random character generated by the server.

However, because the client device generates the hidden form field at the same time that it generates the form, the name of the hidden form field is set in advance, and so the name of the hidden form field generated upon each request for the form is always the same. Therefore, it is possible that through multiple requests of the form by the client device, malicious automatic completion programs are able to determine the hidden form field name through analysis, so that the programs are eventually able to recognize the form and thereby perform automated completion of the form.

BRIEF DESCRIPTION OF THE DRAWINGS

Various embodiments of the invention are disclosed in the following detailed description and the accompanying drawings.

DETAILED DESCRIPTION

Figure 1:
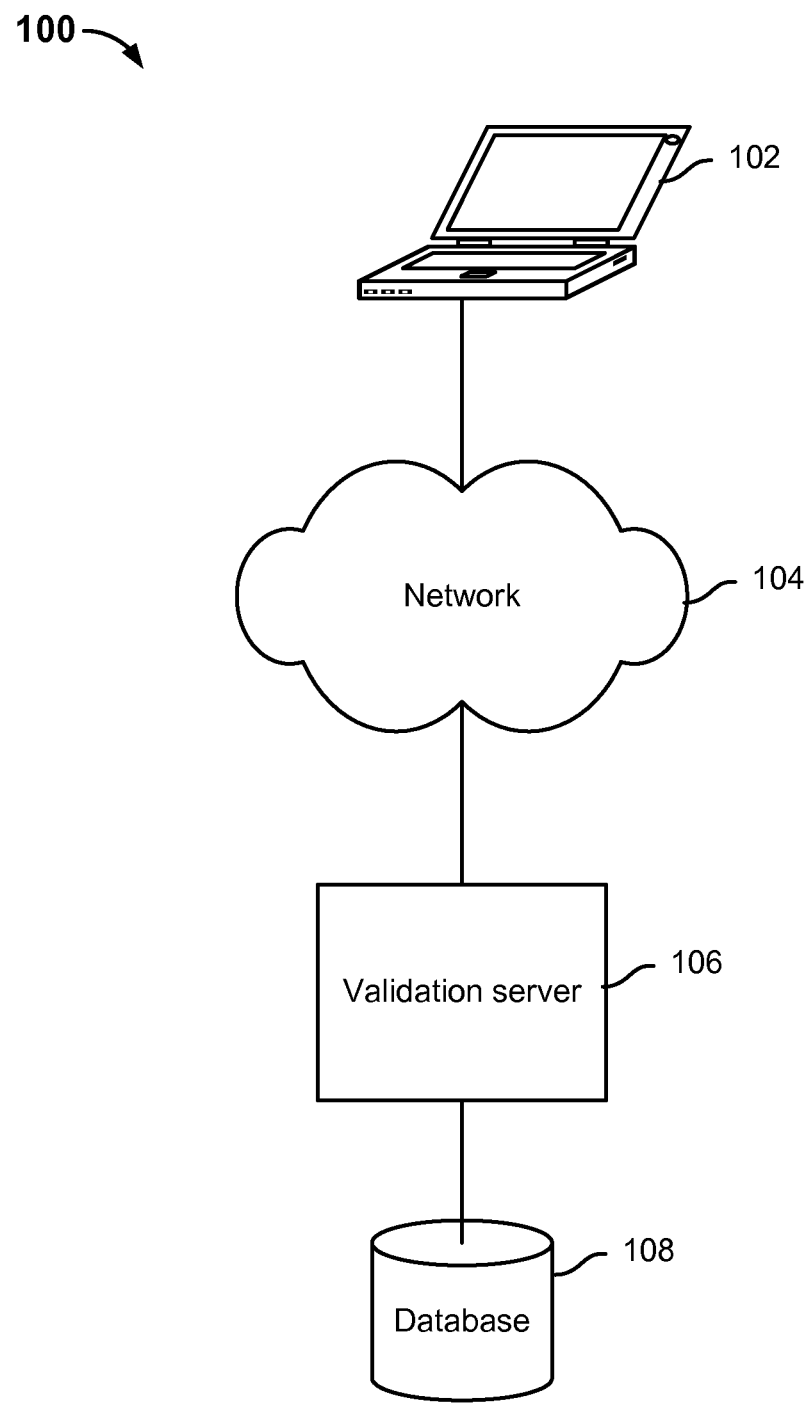
FIG. 1 is a diagram showing an embodiment of a system for form validation.

The invention can be implemented in numerous ways, including as a process; an apparatus; a system; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The present application can be used in many general-purpose or specialized computing device environments or configurations. For example: personal computers, server computers, handheld equipment or portable equipment, tablet equipment, multiprocessor devices, and distributed computing environments comprising any of the above devices or equipment, etc. can be used.

The present application can be described in the general context of computer executable commands executed by a computer, such as a program module. Generally, program modules include routines, programs, objects, components, data structures, etc. to execute specific tasks or achieve specific abstract data types. The present application can also be carried out in distributed computing environments. In such distributed computing environments, tasks are executed by remote processing equipment connected via communication networks. In distributed computing environments, program modules can be located on storage media at local or remote computers that include storage equipment.

Embodiments of form validation are described herein. In various embodiments, in response to a user request received at a server for a form, a first parameter and a second parameter are generated by the server. For example, the user request is associated with a user using a web browser to access a webpage associated with the form. In some embodiments, the respective values of the first parameter and the second parameter are randomly generated. At least data associated with the form and a first triggering message including the first parameter and the second parameter are transmitted to the client device. The client device is configured to generate the form to be presented to a user. The first triggering message is configured to cause a hidden form field to be generated at the client device based on the first parameter and a value corresponding to the hidden form field to be generated based on the second parameter. A value determined based on the second parameter will be assigned as the value corresponding to the hidden form field if a value assignment event is detected with respect to the client device. The value assignment event is configured to be any event/operation that is associated with a human interaction associated with the client device, such as a received mouse movement. The completed form including the hidden form field and the value corresponding to the hidden form field is submitted to the server. In the event that the server verifies that the hidden form field corresponds to the first parameter and the submitted value of the hidden form field corresponds to the second parameter, then the submitted form data is successfully validated and the server may continue to process the received data. It is assumed that submitted form data is submitted by a human user and therefore validated because the correct value, the value based on the second parameter, was assigned as the value corresponding to the hidden form field in response to a detection of a human-related value assignment event and that should an automatic completion computer program have attempted to complete the form data, the program would not have learned the hidden form field and/or its corresponding value would not have successfully completed the form. However, if the server determines either or both that the hidden form field does not correspond to the first parameter or the submitted value of the hidden form field does not correspond to the second parameter, then the submitted data is assumed to not have been completed by a human user and so the data is not successfully validated and the server may not process the received data.

FIG. 1 is a diagram showing an embodiment of a system for form validation. In the example, system 100 includes device 102, network 104, validation server 106, and database 108. Network 104 may include high-speed networks and/or telecommunication networks.

A user may use device 102 to request a form from a web server associated with validation server 106. For example, the form may be associated with logging into a website or posting a comment at an online forum. While device 102 is shown to be a laptop, other examples of device 102 may include a desktop computer, a tablet device, a mobile device, a smart phone, and any other type of computing device. For example, a user may request the form using a web browser or other application running on device 102 to access a particular webpage associated with the form.

In response to the request for the form, validation server 106 is configured to generate at least a first parameter and a second parameter. In some embodiments, validation server 106 is configured to generate a new first parameter and a new second parameter for each received request. In some embodiments, validation server 106 is configured to store a relationship between each received request and the corresponding first parameter and second parameter generated for the request at database 108. Validation server 106 is configured to send a first triggering message that includes the first parameter and the second parameter to device 102. The first triggering message includes computer code that when executed is configured to cause a hidden form field to be generated at device 102 based at least in part on the first parameter and to be added to the form and a value corresponding to the hidden form field to be determined based at least in part on the second parameter. In response to receiving the first triggering message, device 102 is configured to generate the hidden form field based on the first parameter and, in response to detection of a value assignment event, assign a value to the hidden form field based on the second parameter. Validation server 106 is configured to receive from device 102 data associated with submission of the form. Validation server 106 is configured to determine whether the submitted data can be validated based on whether the received data corresponds to the first parameter and the second parameter associated with the requested form (as determined using database 108), as will be described in detail below.

Figure 2:
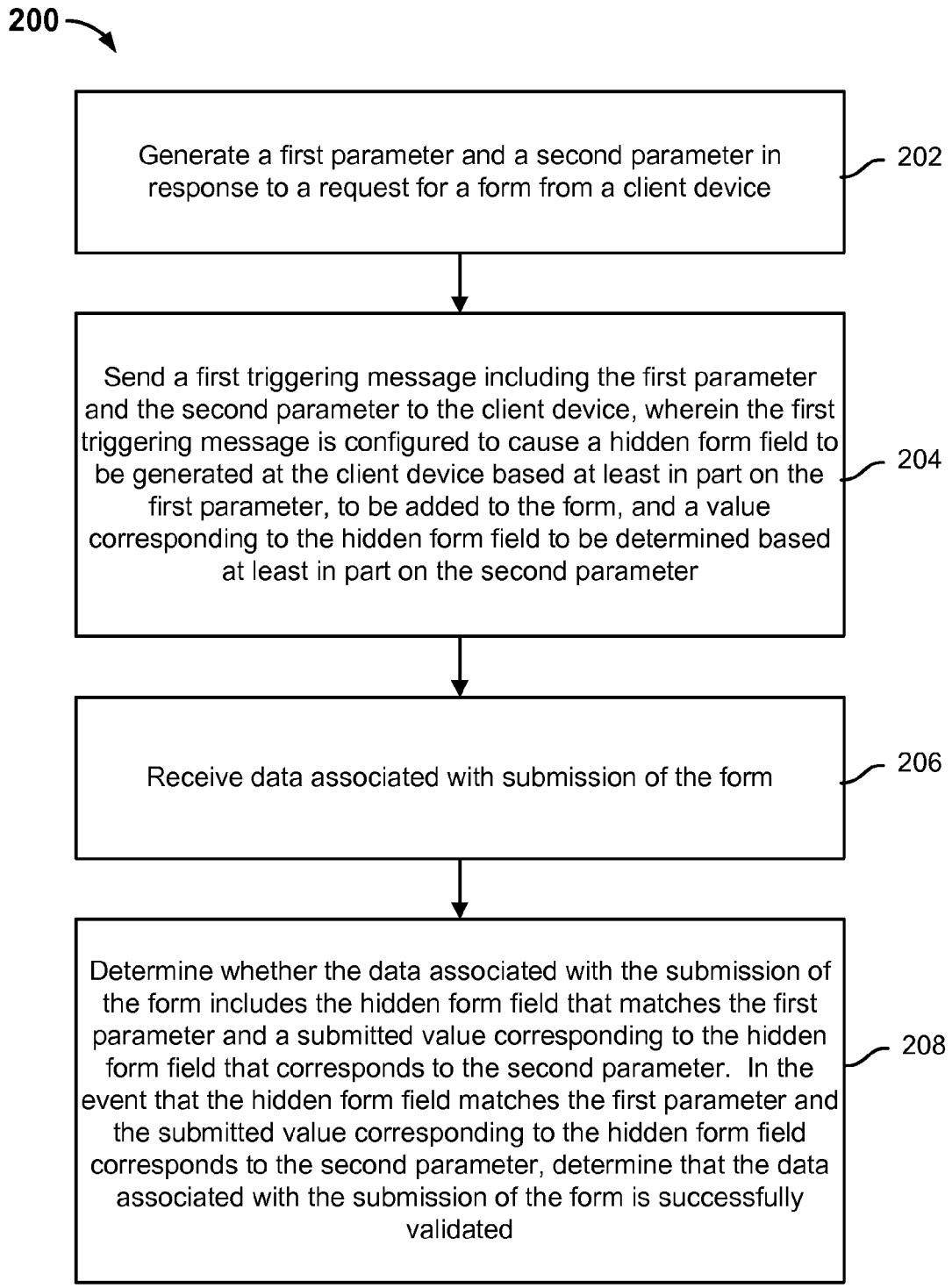
FIG. 2 is a flow diagram showing an embodiment of a process for form validation.

FIG. 2 is a flow diagram showing an embodiment of a process for form validation. In some embodiments, process 200 is implemented at system 100.

At 202, in response to receipt of a request for a form from a client device, a first parameter and a second parameter are generated. For example, a user using a web browser installed at a client device to access a website may encounter a webpage associated with a form. The user may select to visit the webpage, which causes the web browser to send a request for data, including the form, associated with the webpage. The request is received at a web server associated with the webpage. For example, the form may be a registration form, a sign-in form, or a comment posting form associated with an online forum.

In some embodiments, the first parameter and the second parameter may be assigned two respective randomly generated strings. For example, each string may include one or more alphanumeric characters. In some embodiments, to enhance the security of the information and to prevent theft, the randomly generated strings are first encrypted before being assigned, respectively, to the first parameter and the second parameter. For example, the strings to be assigned, respectively, to the first parameter and the second parameter are encrypted with random encryption keys generated using any encryption key technique. In a specific example, in response to receipt of a request for a form from a client device, the server randomly generates strings, String1 and String2, which are encrypting using a website encryption key and/or timestamp information to separately generate encrypted strings E(String1) and E(String2), which are respectively assigned to the first parameter and the second parameter. The website encryption key can be a unique identification number of the website that the user is currently browsing. The timestamp may, for example, be the client device's operating system's current time. An example of an encryption technique to use is MD5 (Message Digest Algorithm, version 5). In some embodiments, in order to increase the complexity of encryption, an automatically defined encryption technique using a scripting language executed by the server, such as PHP (Hypertext Preprocessor), may be used as the encryption technique. The server is configured to store the first parameter and the second parameter so that the server can later compare data submitted over the form to the stored first and second parameters.

At 204, a first triggering message including the first parameter and the second parameter is sent to the client device, wherein the first triggering message is configured to cause a hidden form field to be generated at the client device based at least in part on the first parameter, to be added to the form, and a value corresponding to the hidden form field to be determined based at least in part on the second parameter. The server is configured to send data associated with the requested form and a first triggering message to the client device. The first triggering message includes at least the first parameter and the second parameter. In response to receiving the data from the server, the client device (or a web browser application installed at the client device) is configured to generate the form based on the received data. In some embodiments, the first triggering message includes instructions and/or computer code that when executed causes the client device (or a web browser application installed at the client device) to generate a hidden form field to add to the form. The hidden form field is not visible to users who are presented with the form. The hidden form field and its corresponding value will be submitted to the server along with the rest of the data input into the form when the form is submitted to the server. The hidden form field comprises a name and a value. In some embodiments, the value of the hidden form field is a numerical value. The first triggering message causes the client device (or a web browser application installed at the client device) to generate the name of the hidden form field based on the first parameter and, in response to a detected value assignment event, to assign to the hidden form field a value determined based on the second parameter. In some embodiments, the client device's generation of the hidden form field is based on invoking a hidden form field generation function. In order to avoid interception of the client device's form data by malware for the purpose of analyzing the content of the hidden form field, the server may include in the first triggering message instructions to cause the client device to perform obfuscation processing, i.e., code obfuscation, on the hidden form field generation function and other executable code, so that even if the obfuscated code is intercepted, the intercepting party will be unable to recognize it.

In some embodiments, after the hidden form field is generated based on the first parameter, the hidden form field is assigned a temporary value. Then when a value assignment event is detected, a validation string that is generated based on the second parameter is assigned as the value of the hidden form field (to replace the previously assigned temporary value). The validation string may be generated by the server and sent to the client device or the validation string may be generated at the client device. The value assignment event refers to an event triggered when a real person user (a human user) executes an operation with respect to the client device (e.g., a human-machine interaction that is performed by the human user and received at an interface of the client device). For example, a value assignment event is a mouse movement event. For example, during the process of completing the form, a human user needs to operate the mouse so that the mouse cursor moves on the display interface of the client device. Thus, when the client device detects such a mouse movement event, this event represents that the user completing the form is a human user and so a value determined based on the second parameter is then assigned to the hidden form field. In some embodiments, events that are considered as value assignment events may be configured by a system operator. Thus, even if the first parameter and the second parameter are obtained by a malicious automatic form completion program, the program may not be able to achieve the assignment of a correct value to the hidden form field. Other examples of value assignment events include a keyboard operation event, a touchscreen operation (if the device supports a touchscreen as an input device), or any other events that are able to distinguish form operations executed by humans from those executed by automatic completion programs.

In some embodiments, the validation string to be assigned to replace the temporary value corresponding to the value of the hidden form field in response to the detection of a value assignment event is determined to be the same as the second parameter. If the validation string is the same as the second parameter, then in response to the detection of a value assignment event, the second parameter is assigned as the value of the hidden form field.

In some embodiments, the validation string to be assigned to replace the temporary value corresponding to the value of the hidden form field in response to the detection of a value assignment event is determined based on an encryption technique and the second parameter. For example, the encryption technique used to generate the validation string based on the second parameter may be MD5. In some embodiments, the server determines the encrypted value of the validation string and sends the validation string to the client device. In some embodiments, the encryption technique used to determine the validation string based on the second parameter may be selected in advance at the client device or dynamically determined by a script. For example, an executing script (e.g., JavaScript) may cause the selected encryption technique to be performed on the second parameter to yield the validation string. In some embodiments, other information such as a website encryption key and the timestamp may also be used in addition to the second parameter and the encryption technique to generate the validation string.

In some embodiments, after the server generates the validation string, it stores the validation string. The server may store the validation string associated with a session and associate the validation string with an expiration period. If the form to which the hidden form field is added is submitted after the expiration period since the form was requested, then the server will automatically determine that the submitted data associated with the form is not successfully validated.

At 206, data associated with submission of the form is received. After values are input corresponding to other fields of the form, for example, the form may be submitted by selection of a selectable element ("button") configured to submit the data input into the form to the server. Or for example, the form can also be submitted through an automatic form submission process. The data associated with the hidden form field is also submitted with the other values input into the form.

At 208, it is determined whether the data associated with the submission of the form includes the hidden form field that matches the first parameter and a submitted value corresponding to the hidden form field that corresponds to the second parameter. In the event that the hidden form field matches the first parameter and the submitted value corresponding to the hidden form field corresponds to the second parameter, determine that the data associated with the submission of the form is successfully validated.

After the server receives the data submitted over the form to which the hidden form field has been added, the server first determines whether the hidden form field matches to the first parameter that the server had generated. Then the server verifies whether the submitted value corresponding to this hidden form field corresponds to the second random parameter that the server had generated. In the event that the validation string that was assigned as the value of the hidden form field is the same as the second parameter, then the server determines that the submitted value corresponding to the hidden form field corresponds to the second parameter if the value corresponding to the hidden form field is the same as the second parameter. In the event that the validation string that was assigned as the value of the hidden form field is determined using an encryption technique and the second parameter, the server determines that the submitted value corresponding to the hidden form field corresponds to the second parameter if the submitted value corresponding to the hidden form field can be decrypted to match the second parameter or that the second parameter can be encrypted to match the submitted value corresponding to the hidden form field. Because for each instance of a form retrieval and submission process, the server generates a new first parameter and a new second parameter, the name of the hidden form field added to each retrieved form is updated and the value corresponding to the hidden form field is also updated. Updating the first parameter and the second parameter for each new request of a form makes it difficult for automatic completion programs to learn the updated name of the hidden form field and its updated value each time. Moreover, because the correct value of the hidden form field that is determined based on the second parameter is triggered to be assigned to the hidden form field in response to a detection of a value assignment operation associated with a human-related operation with respect to the client device, if the server determines that the submitted value corresponding to the hidden form field matching the first parameter does not correspond to the second parameter, than it is assumed that the form was not completed by a real person user (a human user) and therefore the submitted data is not successfully validated. If the server determines that the submitted data is not successfully validated, the server does not continue to process the submitted data. However, if the server determines that the name of the hidden form field matches the first parameter and the submitted value corresponding to the hidden form field corresponds to the second parameter, then it is assumed that the form was completed by a real person user and therefore the submitted data is successfully validated. If the server determines that the submitted data is successfully validated, the server does continue to process the submitted data. Examples of processing the submitted data may include granting access to the client device to data stored by the server, performing identification, returning login information to the client device, and causing the client device to post the submitted data at a forum.

Figure 3:
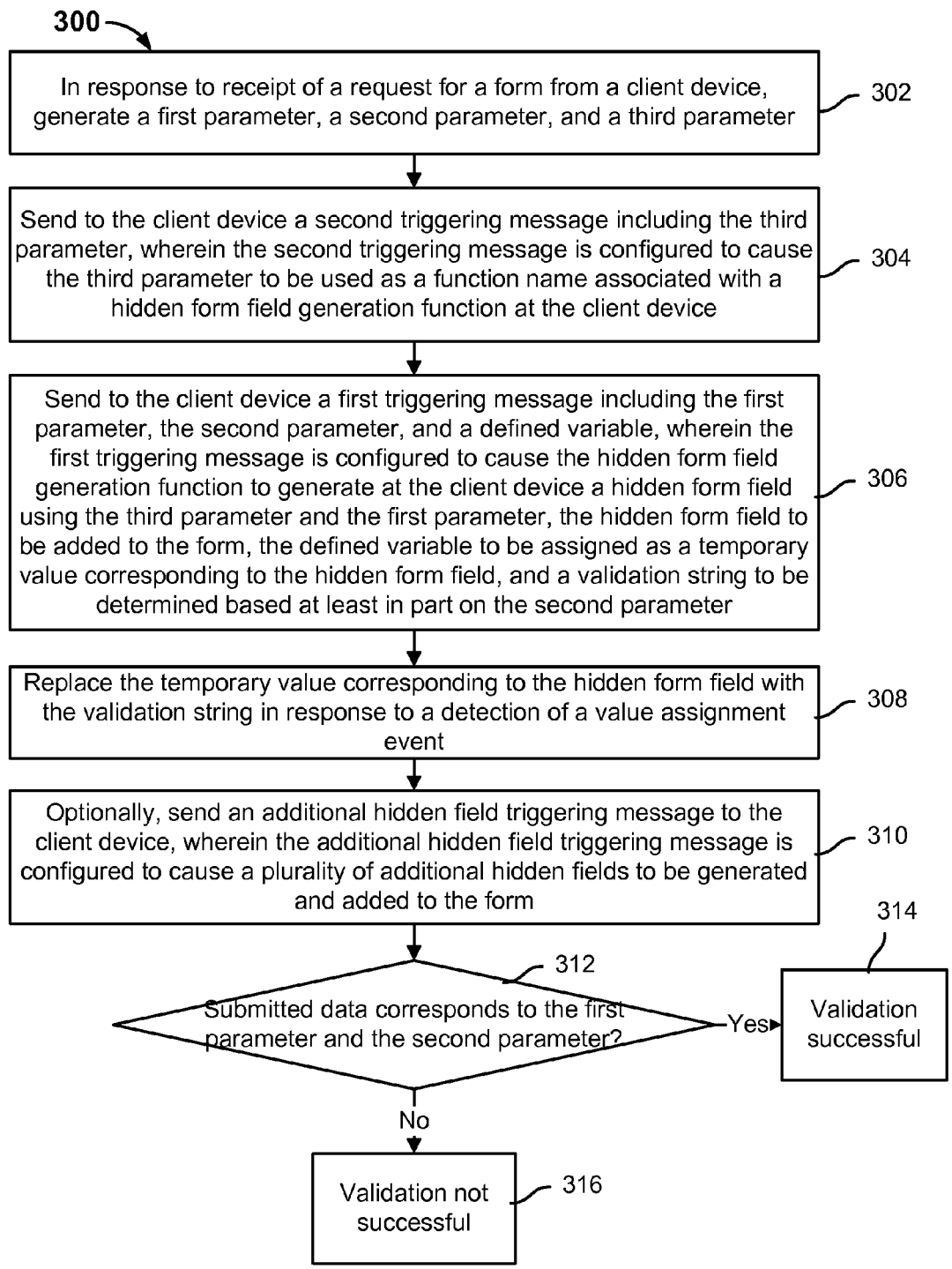
FIG. 3 is a flow diagram showing an embodiment of a process for form validation.

FIG. 3 is a flow diagram showing an embodiment of a process for form validation. In some embodiments, process 300 is implemented at system 100.

Process 300 is similar to process 200 but includes an additional third parameter that is generated by the server and used to invoke a hidden form field generation function to be used at the client device.

At 302, in response to receipt of a request for a form from a client device, a first parameter, a second parameter, and a third parameter are generated. In some embodiments, the first parameter and the second parameter are generated based on techniques similar to those described in process 200. In some embodiments, the third parameter may be generated similarly to the manner in which the first parameter and the second parameter are generated. For example, a value may be randomly generated and, in some embodiments, encrypted using an encryption technique, and assigned as the third parameter.

At 304, a second triggering message including the third parameter is sent to the client device, wherein the second triggering message is configured to cause the third parameter to be used as a function name associated with a hidden form field generation function at the client device. The client device's (or a web browser installed at the client device) generation of the hidden form field is performed by invoking a hidden form field generation function. In some embodiments, the server defines the function name of the hidden form field generation function and triggers the client device (or an associated web browser) to use the third parameter as the function name of the hidden form field generation function. In some embodiments, the server triggers the client to perform obfuscation processing on the hidden form field generation function.

At 306, a first triggering message including the first parameter, the second parameter, and a defined variable is sent to the client device, wherein the first triggering message is configured to cause the hidden form field generation function to generate a hidden form field using the third parameter and the first parameter at the client device, the hidden form field to be added to the form, the defined variable to be assigned as a temporary value corresponding to the hidden form field, and a validation string to be determined based at least in part on the second parameter.

As described above, data associated with the form is sent to the client device along with the first triggering message. The form is generated at the client device based on the received data. The first triggering message may include computer code, which when executed at the client device, causes the name of the first hidden form field to be assigned based on the first parameter and, in response to detection of a value assignment event, a validation string to be assigned to the value corresponding to the hidden form field. Furthermore, the hidden form field is added to the form. In some embodiments, the client device is triggered to invoke the hidden form field generation function named using a third random parameter, and to generate the hidden form field with a name determined based on the first parameter. In order to further prevent information from being intercepted and decrypted, in some embodiments, the server defines a variable to be used as the temporary value of the hidden form field after the hidden form field is generated.

At 308, the temporary value corresponding to the hidden form field is replaced with the validation string in response to a detection of a value assignment event. Eventually, the temporary value of the hidden form field is replaced by the validation string determined based on the second parameter. The temporary value of the hidden form field is replaced by the validation string determined based on the second parameter in response to a detection of a value assignment event. As described above, a value assignment event is configured to be any event that is associated with an operation/interaction with the client device that is associated with a human user.

At 310, optionally, an additional hidden field triggering message is sent to the client device, wherein the additional hidden field triggering message is configured to cause a plurality of additional hidden fields to be generated and added to the form. In some embodiments, the server sends an additional hidden field triggering message to the client device. The additional hidden field triggering message includes computer code that when executed at the client device, causes multiple additional hidden fields that will not be used to validate the form to be generated and added to the form (as opposed to the hidden form field generated based on the first and second parameters, which will be used for validation). The purpose of adding such additional hidden fields is to confuse malicious parties that may attempt to automatically complete the form so that the parties would not know which hidden field of the form will be used for validation. Unlike the hidden form field to be used for validation purposes by the server, values of the generated additional hidden fields will be assigned strings randomly determined by the server and included in the additional hidden field triggering message. The values assigned to the additional hidden fields may also be randomly generated by the client device. The server keeps track of the data (e.g., the first triggering message, the second triggering message, the first parameter, the second parameter, the third parameter, the defined variable, and/or the strings to be assigned to additional hidden fields, etc.) that is sent to each particular client device so that the server can later compare data received from the client device to its maintained data.

At 312, it is determined whether the data associated with the submission of the form includes the hidden form field that matches the first parameter and a submitted value corresponding to the hidden form field that corresponds to the second parameter. In the event that the hidden form field matches the first parameter and the submitted value corresponding to the hidden form field corresponds to the second parameter, control passes to 314 and it is determined that the data associated with the submission of the form is successfully validated. Otherwise, control passes to 316 and it is determined that the data associated with the submission of the form is not successfully validated.

The form submitted by the client device includes a hidden form field that is used for form validation and additional hidden fields that are not used for form validation, but since the server had generated the first parameter, the server knows to look for a hidden field included in the submitted data whose name corresponds to the first parameter, the hidden form field, and to use this determined hidden form field for validation purposes. Similar to what is described for process 200, if the server determines that the submitted value corresponding to the hidden form field matching the first parameter does not correspond to the second parameter, then it is assumed that the form was not completed by a human user and therefore the submitted data is not successfully validated. If the server determines that the submitted data is not successfully validated, the server does not continue to process the submitted data. However, if the server determines that the name of the hidden form field matches the first parameter and the submitted value corresponding to the hidden form field corresponds to the second parameter, then it is assumed that the form was completed by a human user and therefore the submitted data is successfully validated. If the server determines that the submitted data is successfully validated, the server does continue to process the submitted data.

Figure 4:
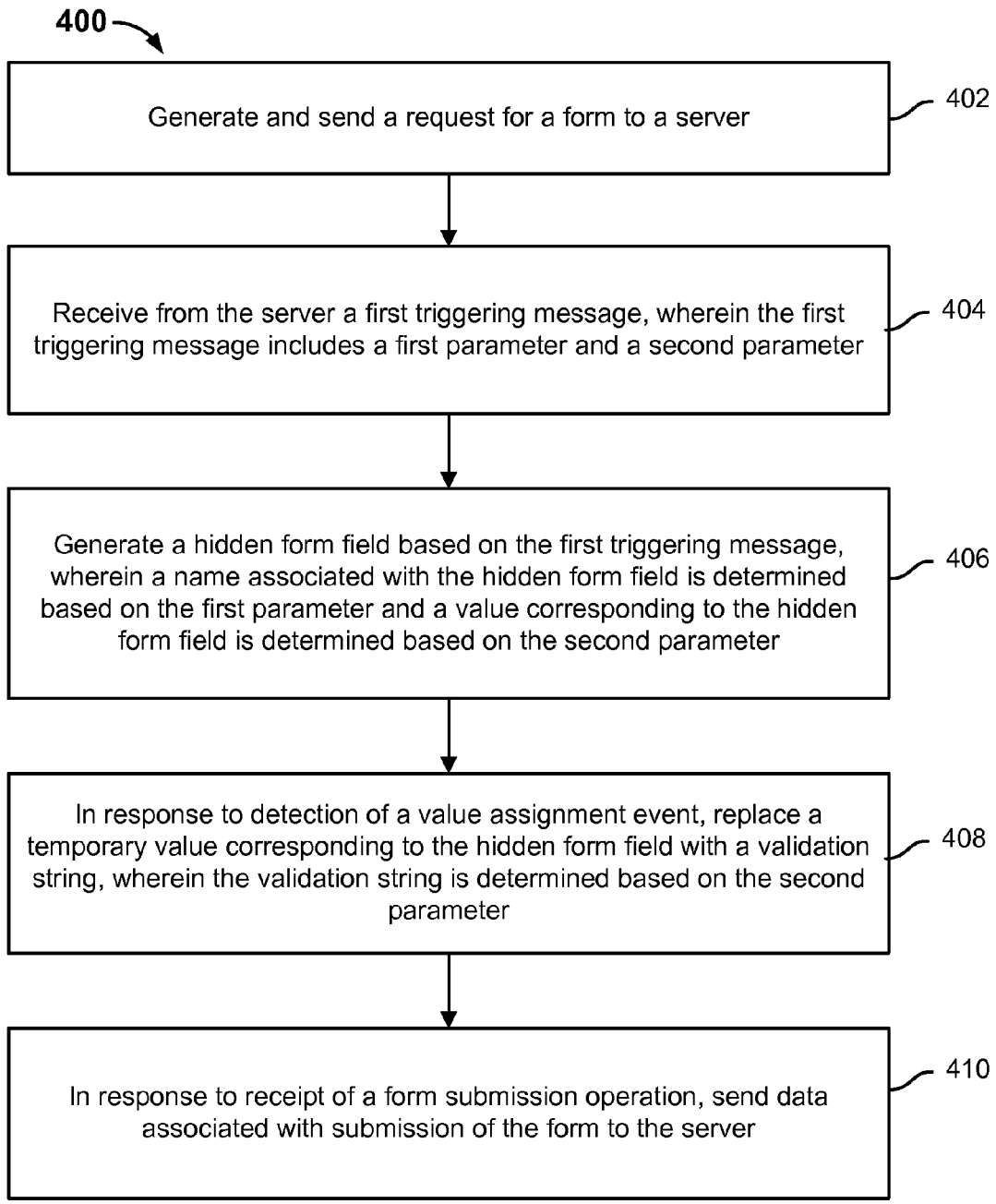
FIG. 4 is a flow diagram showing an embodiment of a process for form validation.

FIG. 4 is a flow diagram showing an embodiment of a process for form validation. In some embodiments, process 400 is performed at system 100, for example, at device 102.

At 402, a request for a form is generated and sent to a server. For example, the request for the form may be generated in response to a user at the client device accessing a webpage that includes the form.

At 404, a first triggering message is received from the server, wherein the first triggering message includes a first parameter and a second parameter. The first triggering message and the second triggering message are received at the client device. In some embodiments, the first triggering message also includes a defined variable. In some embodiments, a second triggering message including a third parameter is also received from the server.

At 406, a hidden form field is generated based on the first triggering message, wherein a name associated with the hidden form field is determined based on the first parameter and a value corresponding to the hidden form field is determined based on the second parameter. The first triggering message includes computer code that is configured to cause the hidden form field to be determined based on the first parameter and the value corresponding to the hidden form field to be determined based on the second parameter. In some embodiments, the function name of the hidden form field generation function is determined based on the third parameter. In some embodiments, the defined variable is assigned as a temporary value to the hidden form field. In some embodiments, a validation string that was determined based on the second parameter was received from the server or generated at the client device. The validation string is to replace the temporary value of the hidden form field in response to a value assignment event detected at the client device.

At 408, in response to detection of a value assignment event, a validation string is used to replace a temporary value corresponding to the hidden form field, wherein the validation string is determined based on the second parameter. As described above, the value assignment event may be configured as any event that is associated with an operation received at the client device that is associated with a real person (human) user, such as, for example, a movement of a mouse or an input of a key from a keyword.

At 410, in response to receipt of a form submission operation, data associated with submission of the form is sent to the server. For example, the form submission operation may be associated with a user selection of a button presented with the form at the webpage. The server will validate the data submitted over the form based at least in part on comparing data including the submitted name and value of the hidden form field to the first parameter and the second parameter. If the server determines that the submitted data can be successfully validated, then the server may send further data to the client device, such as data associated with granting access to the client device to protected information, for example.

Figure 5:
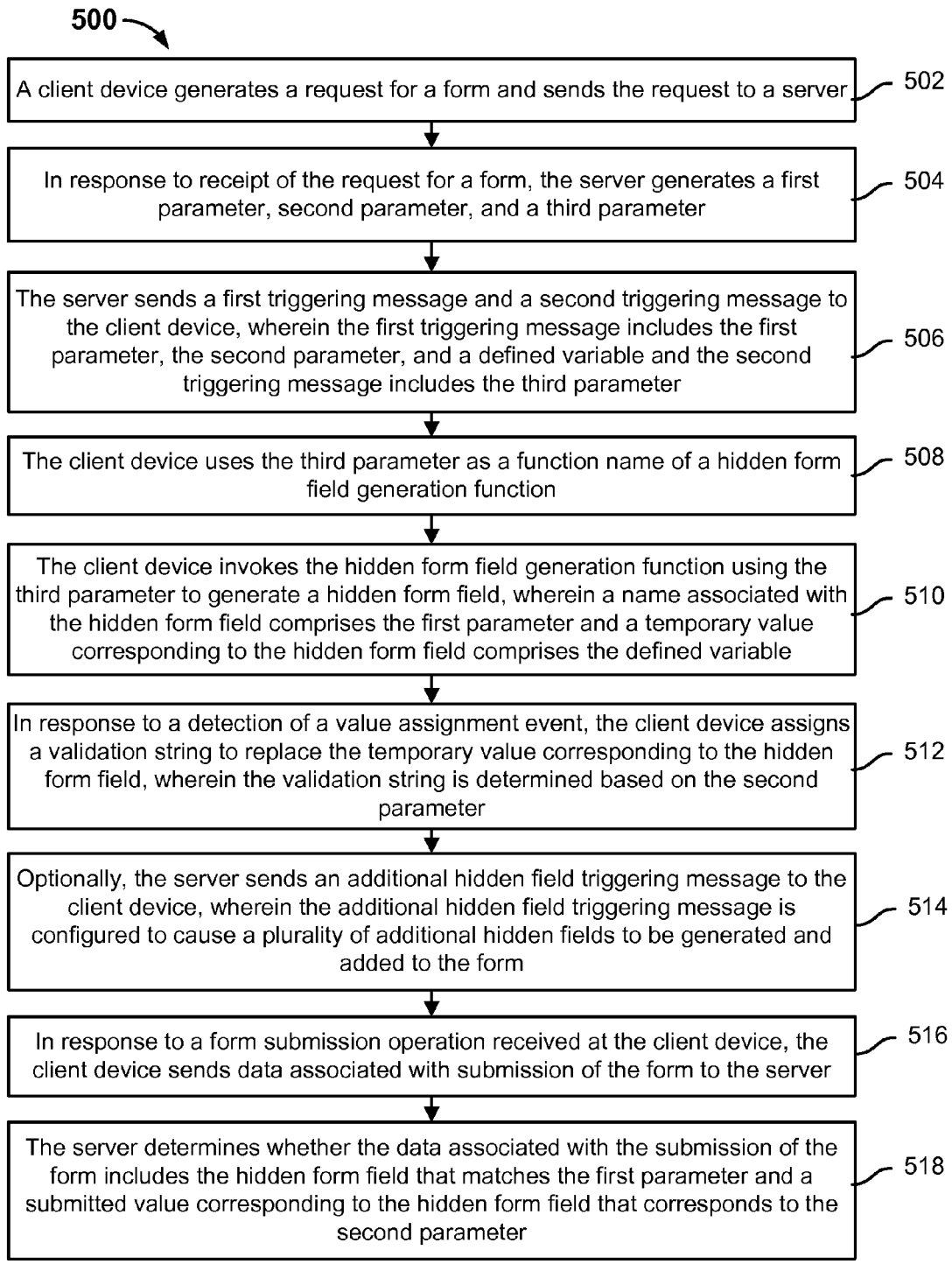
FIG. 5 is a flow diagram showing an embodiment of a process for form validation.

FIG. 5 is a flow diagram showing an embodiment of a process for form validation. In some embodiments, process 500 is performed at system 100.

At 502, a request for a form is generated at a client device and sent to a server.

At 504, in response to receipt of the request for a form, the server generates a first parameter, a second parameter, and a third parameter.

At 506, a first triggering message and a second triggering message are sent by the server to the client device, wherein the first triggering message includes the first parameter, the second parameter, and a defined variable and the second triggering message includes the third parameter.

At 508, the third parameter is used by the client device as a function name of a hidden form field generation function.

At 510, the hidden form field generation function is invoked by the client device using the third parameter to generate a hidden form field, wherein a name associated with the hidden form field comprises the first parameter and a temporary value corresponding to the hidden form field comprises the defined variable.

At 512, in response to detection of a value assignment event, the client device assigns a validation string to replace the temporary value corresponding to the hidden form field, wherein the validation string is determined based on the second parameter.

At 514, optionally, an additional hidden field triggering message is sent by the server to the client device, wherein the additional hidden field triggering message is configured to cause a plurality of additional hidden fields to be generated and added to the form.

At 516, in response to a form submission operation received at the client device, data associated with submission of the form is sent by the client device to the server.

At 518, it is determined by the server whether the data associated with the submission of the form includes the hidden form field that matches the first parameter and a submitted value corresponding to the hidden form field that corresponds to the second parameter.

Regarding the various process embodiments described above, for the sake of simplicity, all have been presented as combinations of a series of actions. However, persons skilled in the art should be aware that this application is not limited by the sequence of actions described, because pursuant to this application, certain steps may be executed in other sequences or simultaneously.

Figure 6:
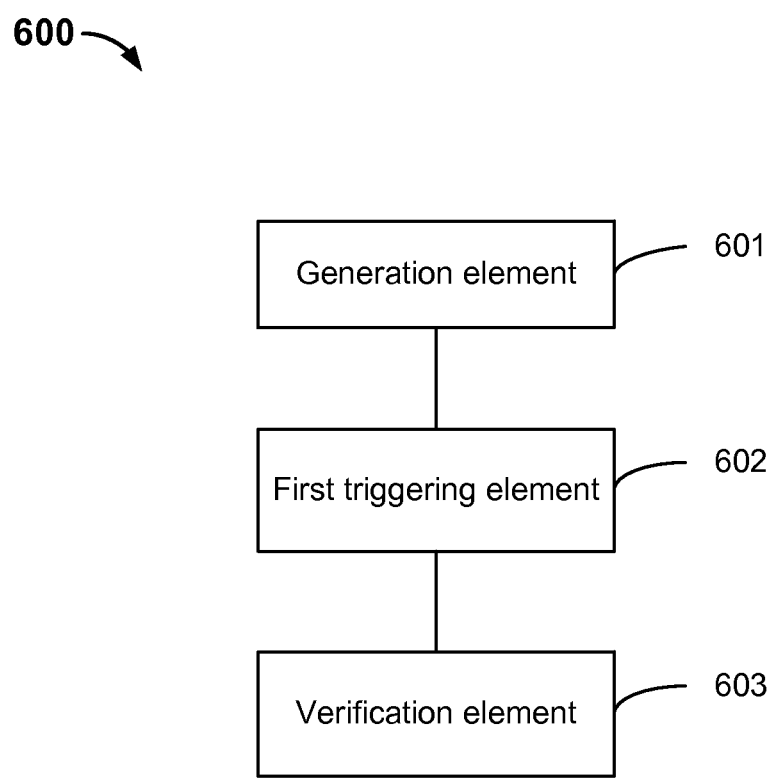
FIG. 6 is a diagram showing an embodiment of a system of form validation.

FIG. 6 is a diagram showing an embodiment of a system of form validation. In the example, system 600 includes generation element 601, first triggering element 602, and verification element 603. In some embodiments, system 600 may be integrated in a web server, or it may be connected to a web server as an independent entity.

The elements can be implemented as software components executing on one or more processors, as hardware such as programmable logic devices and/or Application Specific Integrated Circuits designed to perform certain functions, or a combination thereof. In some embodiments, the elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The elements may be implemented on a single device or distributed across multiple devices.

Generation element 601 is configured to generate a first random parameter and a second random parameter in response to a request for a form received from a client device. In some embodiments, the first parameter and the second parameter are assigned values that are randomly generated by the server. In some embodiments, generation element 601 is configured to encrypt each of the values randomly generated respectively for the first parameter and the second parameter. In one example, the type of encryption used to encrypt the first parameter and the second parameter may have been predetermined. In another example, the type of encryption used may be determined automatically based on a computer program executing at the server.

First triggering element 602 is configured to send a first triggering message that includes the first parameter and the second parameter to the client device. The client device is configured to generate the form based on the received first triggering message, including a hidden form field that is added to the form. The name of the hidden form field is determined based on the first parameter. In some embodiments, a validation string is also generated by first triggering element 602, generation element 601, or the client device based on the second parameter. After the hidden form field is generated, a temporary value is initially assigned as the value corresponding to the hidden form field. The validation string is eventually used to replace the temporary value previously assigned to the hidden form field in response to a value assignment event detected at the client device.

Verification element 603 is configured to receive and verify data associated with a submission of the form. Verification element 603 is configured to determine a hidden field from the submitted data whose name matches the first parameter (the hidden form field) and to determine whether a submitted value associated with the field corresponds to the second parameter. In the event that the validation string that was assigned to the hidden form field is the same as the second parameter, verification element 603 is configured to determine whether the submitted value corresponding to the hidden form field is the same as the second parameter. In the event that the validation string that was assigned to the hidden form field is determined as an encryption of at least the second parameter, then verification element 603 is configured to determine whether the submitted value corresponding to the hidden form field is the same as the encryption of at least the second parameter. If verification element 603 determines that the hidden field from the submitted data whose name matches the first parameter (the hidden form field) and the submitted value associated with the field correspond to the second parameter, then verification element 603 determines that the submitted data is successfully validated and may proceed to process the data. Otherwise, verification element 603 determines that the submitted data is not successfully validated and may not proceed to process the data.

Figure 7:
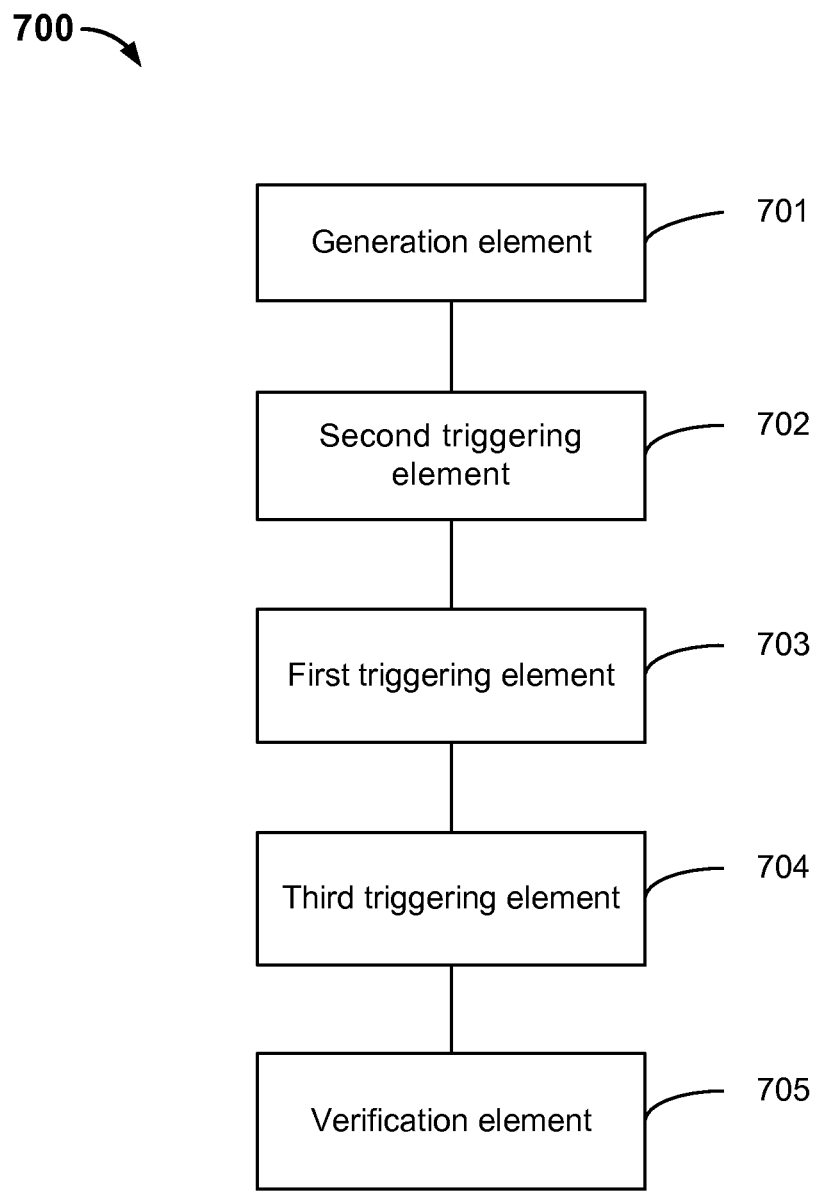
FIG. 7 is a diagram showing an embodiment of a system of form validation.

FIG. 7 is a diagram showing an embodiment of a system of form validation. In the example, system 700 includes generation element 701, second triggering element 702, first triggering element 703, third triggering element 704, and verification element 705. In some embodiments, system 700 may be integrated in a web server, or it may be connected to a web server as an independent entity.

The elements can be implemented as software components executing on one or more processors, as hardware such as programmable logic devices and/or Application Specific Integrated Circuits designed to perform certain functions, or a combination thereof. In some embodiments, the elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The elements may be implemented on a single device or distributed across multiple devices.

Generation element 701 is configured to generate a first random parameter, a second random parameter, and a third parameter in response to a request for a form received from a client device.

Second triggering element 702 is configured to send a second triggering message to the client device. The second triggering message includes the third parameter. The second triggering message is configured to cause the client device to use the third random parameter as the function name of a hidden form field generation function. In some embodiments, the second triggering message is further configured to cause the client device to perform obfuscation processing on the hidden form field generation function.

First triggering element 703 is configured to send a first triggering message that includes the first parameter and the second parameter to the client device.

In some embodiments, the first triggering message further includes a defined variable. The client device is configured to generate the form based on the received first triggering message, including a hidden form field that is added to the form. The hidden form field may be generated using the hidden form field generation function associated with a function name associated with the third parameter. The name of the hidden form field is determined based on the first parameter. In some embodiments, a validation string is also generated by system 700 or the client device based on the second parameter. After the hidden form field is generated, a temporary value is initially assigned as the value corresponding to the hidden form field. In some embodiments, the temporary value is the defined variable sent by first triggering element 703. The validation string is eventually used to replace the temporary value previously assigned to the hidden form field in response to a value assignment event detected at the client device.

Third triggering element 704 is configured to send an additional hidden field triggering message to the client device. The additional hidden field triggering message is configured to cause multiple hidden fields to be generated and added to the form at the client device.

Verification element 705 is configured to receive and verify data associated with a submission of the form. Verification element 705 is configured to identify the correct hidden field of the submitted data that is used to perform validation, the hidden form field, based on recognizing the hidden field associated with a name that matches the first parameter. This way, unlike malicious automatic form completion programs, verification element 705 will not be confused by the presence of multiple hidden fields, such as those generated based on the additional hidden field triggering message.

In the event that the validation string that was assigned to the hidden form field is the same as the second parameter, then verification element 705 is configured to determine whether the submitted value corresponding to the hidden form field is the same as the second parameter. In the event that the validation string that was assigned to the hidden form field is determined as an encryption of at least the second parameter, then verification element 705 is configured to determine whether the submitted value corresponding to the hidden form field is the same as the encryption of at least the second parameter. If verification element 705 determines that the hidden field from the submitted data whose name matches the first parameter (the hidden form field) and the submitted value associated with the field correspond to the second parameter, then verification element 705 determines that the submitted data is successfully validated and may proceed to process the data. Otherwise, verification element 705 determines that the submitted data is not successfully validated and may not proceed to process the data.

The embodiments included in the present application are described in a progressive manner and the explanation of each embodiment focuses on areas of difference from the other embodiments, and the descriptions thereof may be mutually referenced for portions of each embodiment that are identical or similar. In regard to system-type embodiments, because they are fundamentally similar to the process embodiments, their descriptions are relatively simple. Refer to partial explanations in the method embodiments where relevant.

Lastly, it must also be explained that, in this document, relational terms such as "first" or "second" are used only to differentiate between one entity or operation and another entity or operation, without necessitating or implying that there is any such actual relationship or sequence between these entities or operations. Furthermore, the terms "comprise" or "contain" or any of their variants are to be taken in their non-exclusive sense. Thus, processes, methods, objects, or equipment that comprise a series of elements not only comprise those elements, but also comprise other elements that have not been explicitly listed or elements that are intrinsic to such processes, methods, objects, or equipment. In the absence of further limitations, for an element that is limited by the phrase "comprises a(n) . . . ," the existence of additional identical elements in processes, methods, objects or equipment that comprise the elements is not excluded.

For convenience of description, when describing the systems above, functions are described as separate elements. Of course, during implementation of the present application, the functions of the various elements may be achieved in the same or multiple software and/or hardware configurations.

As can be seen through the description of the embodiments above, persons skilled in the art can clearly understand that the present application can be realized with the aid of software plus the necessary common hardware platform. Based on such an understanding, the technical proposal of the present application, whether intrinsically or with respect to portions that contribute to the prior art, is realizable in the form of software products. These computer software products can be stored on storage media, such as ROM/RAM, diskettes, and compact discs, and include a certain number of commands used to cause a set of computing equipment (which could be a personal computer, server, or network equipment) to execute the methods described in the embodiments, or certain portions of the embodiments, of the present application.

This document has employed specific examples to expound the principles and embodiments of the present application. The above embodiment explanations are only meant to aid in comprehension of the methods of the present application and of its core concepts. Moreover, a person with ordinary skill in the art would, on the basis of the concepts of the present application, be able to make modifications to specific applications and to the scope of applications. To summarize the above, the contents of this description should not be understood as limiting the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for form validation, comprising:
one or more memories storing computer-readable instructions; and
one or more processors, coupled to the one or more memories and executing the computer-readable instructions configured to:
  generate a defined variable, a first parameter, a second parameter, and a third parameter in response to a request for a form from a client device;
  store, in a database, the first parameter, the second parameter, and the third parameter corresponding to the client device;
  send data associated with the requested form to the client device, wherein the client device receives the data associated with the requested form, and generates the form based on the received data;
  send a second triggering message including the third parameter to the client device, wherein the second triggering message is configured to cause the third parameter to be used as a function name associated with a hidden form field generation function at the client device;
  send a first triggering message including the defined variable, the first parameter, and the second parameter to the client device, wherein the first triggering message causes the client device to:
    generate a hidden form field based at least in part on the third parameter and the first parameter;
    add the hidden form field to the generated form;
    assign the defined variable as a temporary value corresponding to the hidden form field;
    generate a validation string based on the second parameter, wherein the validation string is generated based on an encryption technique; and
    replace the temporary value corresponding to the hidden form field with the validation string in response to detection by the client device of a value assignment event;
  receive data associated with submission of the form, the data associated with the submission of the form including the hidden form field;
  determine whether the hidden form field matches the first parameter and a submitted value corresponding to the hidden form field corresponds to the second parameter, comprising to:
    look up, from the database, the stored first, second, and third parameters associated with the client device; and
    determine whether the submitted value corresponding to the hidden form field can be decrypted to match the stored second parameter; and
  in the event that the hidden form field matches the first parameter and the submitted value corresponding to the hidden form field corresponds to the validation string, determine that the data associated with the submission of the form is successfully validated.

2. The system of claim 1, wherein at least one of the first parameter and the second parameter is randomly generated.

3. The system of claim 1, wherein the value assignment event is associated with a human-related operation with respect to the client device.

4. The system of claim 1, wherein the value assignment event comprises one or more of the following: a mouse movement, a keyboard operation, and a touch screen operation.

5. The system of claim 1, wherein the one or more processors are further configured to send an additional hidden field triggering message, wherein the additional hidden field triggering message is configured to cause a plurality of additional hidden fields to be generated and added to the form.

6. The system of claim 1, wherein determining whether the data associated with the submission of the form includes the hidden form field that matches the first parameter comprises determining whether the name of the hidden form field matches the first parameter.

7. The system of claim 1, wherein the encryption technique corresponds to a hash function.

8. A method for form validation, comprising:
generating, using one or more processors, a defined variable, a first parameter, a second parameter, and a third parameter in response to a request for a form from a client device;
storing, in a database, the first parameter, the second parameter, and the third parameter corresponding to the client device;
sending data associated with the requested form to the client device, wherein the client device receives the data associated with the requested form, and generates the form based on the received data;
sending a second triggering message including the third parameter to the client device, wherein the second triggering message is configured to cause the third parameter to be used as a function name associated with a hidden form field generation function at the client device;
sending a first triggering message including the defined variable, the first parameter, and the second parameter to the client device, wherein the first triggering message causes the client device to:
  generate a hidden form field based at least in part on the third parameter and the first parameter;
  add the hidden form field to the generated form;
  assign the defined variable as a temporary value corresponding to the hidden form field;
  generate a validation string based on the second parameter, wherein the validation string is generated based on an encryption technique; and
  replace the temporary value corresponding to the hidden form field with the validation string in response to detection by the client device of a value assignment event;
receiving data associated with submission of the form, the data associated with the submission of the form including the hidden form field;
determining whether the hidden form field matches the first parameter and a submitted value corresponding to the hidden form field corresponds to the second parameter, comprising:
  looking up, from the database, the stored first, second, and third parameters associated with the client device; and
  determining whether the submitted value corresponding to the hidden form field can be decrypted to match the stored second parameter;
in the event that the hidden form field matches the first parameter and the submitted value corresponding to the hidden form field corresponds to the validation string, determine that the data associated with the submission of the form is successfully validated.

9. The method of claim 8, wherein at least one of the first parameter and the second parameter is randomly generated.

10. The method of claim 8, wherein the value assignment event is associated with a human-related operation with respect to the client device.

11. The method of claim 8, further comprising sending an additional hidden field triggering message, wherein the additional hidden field triggering message is configured to cause a plurality of additional hidden fields to be generated and added to the form.

12. A device for form validation, comprising:
one or more memories storing computer-readable instructions; and
one or more processors, coupled to the one or more memories and executing the computer-readable instructions configured to:
generate and send a request for a form to a server;
receive, from the server, data associated with the requested form and generate the form based on the received data;
receive from the server a second triggering message including a third parameter, wherein the second triggering message causes the third parameter to be used as a function name associated with a hidden form field generation function;
receive from the server a first triggering message, wherein the first triggering message includes a defined variable, a first parameter, a second parameter, and the third parameter;
generate a hidden form field based at least in part on the third parameter and the first triggering message, wherein the generating of the hidden form field comprises to:
determine a hidden form field generation function based on the third parameter;
generate the hidden form field based on the hidden form field generation function, wherein a name associated with the hidden form field is determined based on the first parameter;
assign the defined variable as a temporary value corresponding to the hidden form field; and
add the generated hidden form field to the generated form;
generate, based on an encryption technique, a validation string based on the second parameter;
in response to detection of a value assignment event, replace the temporary value corresponding to the hidden form field with the validation string; and
in response to receipt of a form submission operation, send data associated with submission of the form to the server, the data associated with the submission of the form including the hidden form field and a value corresponding to the hidden form field;
receive additional data from the server upon successful validation of the data associated with the submission of the form, wherein the validating of the data associated with the submission of the form comprises:
looking up, by the server, from a database, stored values of the first, second, and third parameters corresponding to the request for the form;
determining, by the server, whether the submitted hidden form field matches the stored value of the first parameter; and
determining, by the server, whether the submitted value corresponding to the hidden form field can be decrypted to match the stored value of the second parameter.

13. The device of claim 12, wherein the value assignment event is associated with a human-related operation with respect to the device.

* * * * *

UNITED STATES PATENT AND TRADEMARK OFFICE
CERTIFICATE OF CORRECTION

PATENT NO. : 9,444,910 B2
APPLICATION NO. : 13/787259
DATED : September 13, 2016
INVENTOR(S) : Lin et al.

It is certified that error appears in the above-identified patent and that said Letters Patent is hereby corrected as shown below:

On the Title Page

Item [71], after "George Town," delete "KY (US)"; and insert --(KY)--.

In the Claims

Column 16, Line 60, Claim 8 after "the stored second parameter;" insert --and--.

Signed and Sealed this
Thirtieth Day of May, 2017

Michelle K. Lee
*Director of the United States Patent and Trademark Office*